United States Patent
Gao

(10) Patent No.: US 10,237,508 B2
(45) Date of Patent: Mar. 19, 2019

(54) METHOD AND DEVICE FOR DISPLAYING BOOT SCREEN

(71) Applicants: Hisense Co., Ltd., Qingdao (CN); HISENSE USA CORPORATION, Suwanee, GA (US); Hisense International Co., Ltd., Qingdao (CN)

(72) Inventor: Tongqing Gao, Qingdao (CN)

(73) Assignees: Hisense Co., Ltd., Qingdao (CN); Hisense USA Corporation, Suwanee, GA (US); Hisense International Co., Ltd., Qingdao (CN)

( * ) Notice: Subject to any disclaimer, the term of this patent is extended or adjusted under 35 U.S.C. 154(b) by 388 days.

(21) Appl. No.: 14/662,586

(22) Filed: Mar. 19, 2015

(65) Prior Publication Data

US 2015/0271435 A1    Sep. 24, 2015

(30) Foreign Application Priority Data

Mar. 20, 2014    (CN) .......................... 2014 1 0106252

(51) Int. Cl.
*G06F 9/44*    (2018.01)
*H04N 5/445*    (2011.01)
(Continued)

(52) U.S. Cl.
CPC ............ *H04N 5/445* (2013.01); *G06F 9/4401* (2013.01); *H04N 21/443* (2013.01); *H04N 21/436* (2013.01); *H04N 21/4432* (2013.01)

(58) Field of Classification Search
CPC .. G06F 9/4401; H04N 21/436; H04N 21/443; H04N 21/4432; H04N 5/445
See application file for complete search history.

(56) References Cited

U.S. PATENT DOCUMENTS 8,189,014 B1 * 5/2012 Tam .......................... G09G 5/14
345/629
9,026,772 B2 * 5/2015 Kim ....................... G06F 9/4401
713/2
(Continued)

FOREIGN PATENT DOCUMENTS

| CN | 101252726 A | 8/2008 |
| CN | 101848445 A | 9/2010 |
| CN | 103150178 A | 6/2013 |

OTHER PUBLICATIONS

Office Action from Chinese Application No. 201410106252.2 dated Sep. 30, 2018 (6 pages).

*Primary Examiner* — Abdelmoniem I Elamin
(74) *Attorney, Agent, or Firm* — Harness, Dickey & Pierce, P.L.C.

(57) ABSTRACT

The disclosure provides a method and device for displaying a boot screen so as to address the problem of boot screen jumping in a power-on process in the prior art. After the first device and second devices complete video initialization, the first device establishes a connection for transmitting video data with prescribed one of the second devices, and after system services of the first device and the second device are started, the first device will display directly video data of an application interface of the prescribed second device, so that only the application interface of the second device will be displayed directly after a startup picture is displayed, thus avoiding a jump between the two home application interfaces of the first device and the second device to thereby solve the problem of boot screen jumping.

20 Claims, 5 Drawing Sheets

(51) Int. Cl.
    *G06F 9/4401*     (2018.01)
    *H04N 21/443*     (2011.01)
    *H04N 21/436*     (2011.01)

(56) References Cited

U.S. PATENT DOCUMENTS

| | | | | |
|---|---|---|---|---|
| 2008/0263532 | A1* | 10/2008 | Yang | G06F 8/65 |
| | | | | 717/168 |
| 2010/0325409 | A1* | 12/2010 | Kim | G06F 9/4401 |
| | | | | 713/2 |
| 2014/0168428 | A1* | 6/2014 | Nefedov | H04N 7/18 |
| | | | | 348/143 |
| 2014/0223158 | A1* | 8/2014 | Zhou | G06F 9/4405 |
| | | | | 713/2 |

* cited by examiner

METHOD AND DEVICE FOR DISPLAYING BOOT SCREEN

CROSS-REFERENCE TO RELATED APPLICATION

This application claims the benefit and priority of Chinese Patent Application No. 201410106252.2 filed Mar. 20, 2014. The entire disclosure of the above application is incorporated herein by reference.

FIELD

The present disclosure relates to the field of electronic technologies and particularly to a method and device for displaying a boot screen.

BACKGROUND

This section provides background information related to the present disclosure which is not necessarily prior art.

A combined terminal system includes a plurality of devices for different use. The respective devices are stand-alone systems which may be totally different in hardware and software, e.g., application interfaces of different devices are different. While in the power-on process of the system, the different application interfaces are displayed sequentially as the boot screen. There may be a significant jump between the application interfaces in the power-on process since the application interfaces are different, thus resulting in a problem of boot screen jumping.

SUMMARY

This section provides a general summary of the disclosure, and is not a comprehensive disclosure of its full scope or all of its features.

An embodiment of the disclosure provides a method for displaying a boot screen, the method including:
performing, by a first device, video initialization;
establishing, by the first device, a connection for transmitting video data, with a second device after the video initialization is completed;
displaying, by the first device, video data of an application interface of the second device directly after a system service of the first device is started,
wherein the video data of the application interface of the second device is received by the first device over the connection.

An embodiment of the disclosure provides a method for displaying a boot screen, the method including:
performing, by a second device, video initialization;
establishing, by the second device, a connection for transmitting video data, with a first device after the video initialization is completed; and
transmitting, by the second device, video data of an application interface of the second device to the first device over the connection after a system service of the second device is started, so that the first device displays the video data of the application interface of the second device directly after a system service of the first device is started.

An embodiment of the disclosure provides a first device for displaying a boot screen, the device including:
a first initializing module configured to perform video initialization;
a first connection establishing module configured to establish a connection for transmitting video data, with a second device after the first device completes the video initialization;
an executing module configured to display video data of an application interface of the second device directly after a system service of the first device is started; and a first transmitting module configured to receive the video data of the application interface of the second device over the connection.

An embodiment of the disclosure provides a second device for displaying a boot screen, the device including:
a second initializing module configured to perform video initialization;
a second connection establishing module configured to establish a connection for transmitting video data, with a first device after the second device completes the video initialization; and
a second transmitting module configured to transmit video data of an application interface of the second device to the first device over the connection after a system service of the second device is started, so that the first device displays the video data of the application interface of the second device directly after a system service of the first device is started.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

DETAILED DESCRIPTION

Example embodiments will now be described more fully with reference to the accompanying drawings. It shall be appreciated that the particular embodiments described here are merely intended to illustrate but not limit the disclosure.

In an embodiment of the disclosure, there are a first device and a plurality of second devices in a combined terminal system. In an embodiment of the disclosure, the first device can be a master device, the second device can be a module device. The master device may refer to a device configured to perform the core functions (e.g., display function and the like) and to control the main external devices (e.g., USB apparatus, SD card, WiFi device, Bluetooth-enabled device, TV tuner, HDMI device, AV device and the like) in a combined terminal system; the module device may refer to a device, configured to perform some specific function which is typically dedicated function or intelligent function (e.g., digital TV capabilities, network set-top box function, routing function and the like), in the combined terminal system.

Figure 1:
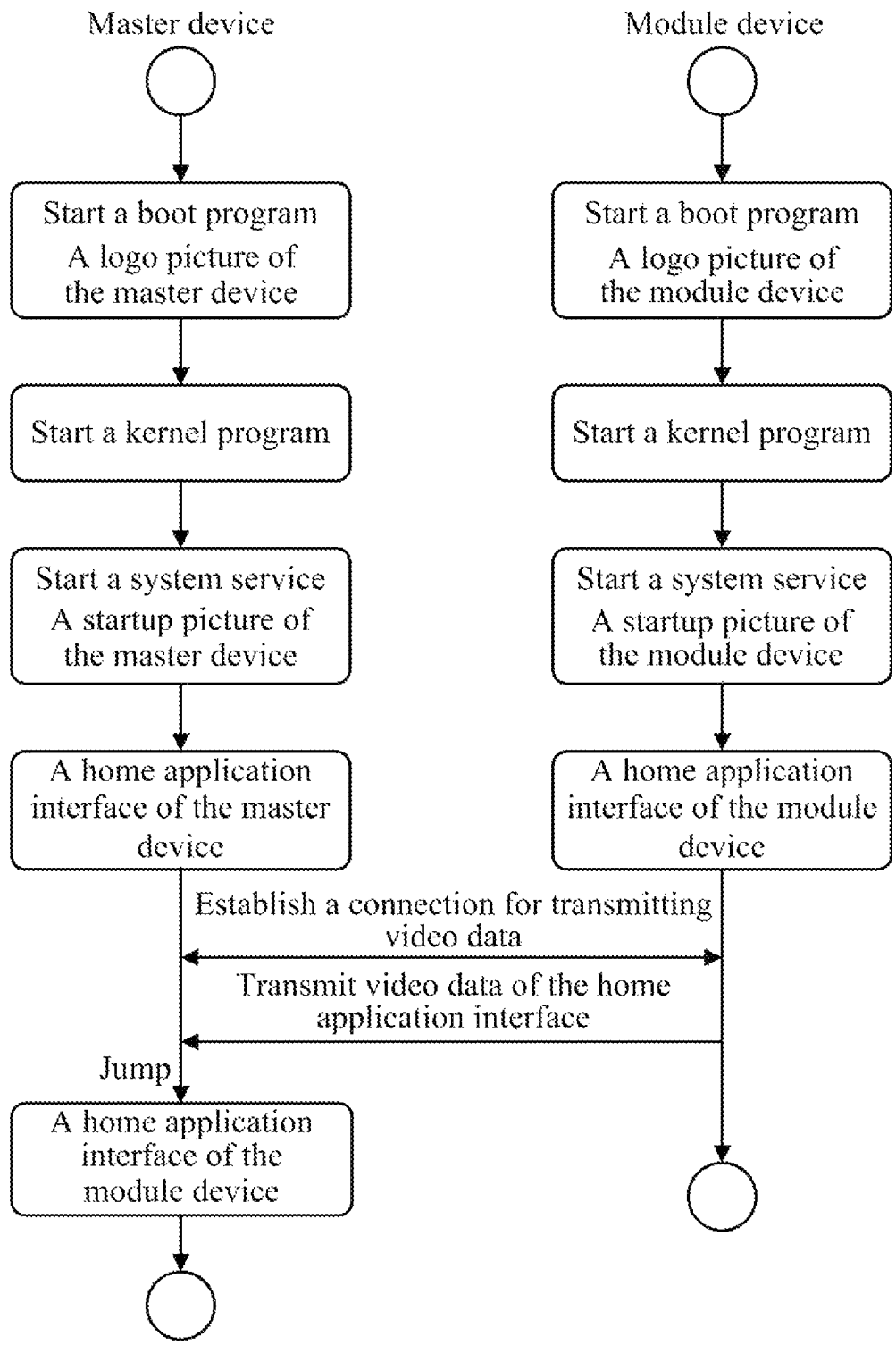
FIG. 1 illustrates a schematic flow chart of a method for displaying a boot screen.

For example, in an embodiment of the disclosure, a method for displaying a boot screen of the combined terminal system is illustrated. As shown in FIG. 1, the combined terminal system includes a master device and a plurality of module devices (only one of the module devices is shown), both of which are standalone systems. In this method, the master device and the module devices start their own systems respectively by starting sequentially a boot program, a kernel program and a system service, and eventually enter their respective application interfaces, for example, the respective home application interfaces as illustrated in FIG. 1. In this process, a boot screen is displayed sequentially as a hardware detection and initialization logo picture while the boot program is being started, a master device startup picture when the system service is being started, and a home application interface of the master device displayed after the system service is started.

A connection for transmitting video data is established between the master device and a specific module device through manual selection or automatic jumping after the home application interface of the master device is entered, so that the boot screen is switched from the home application interface of the master device to a home application interface of the module device to thereby display the boot screen of the combined terminal system as a boot screen of the specific module device.

However, the home application interface of the master device tends to be different from that of the module device throughout the power-on process, so there may be a significant jump between the two home application interfaces of the master device and the module device in the power-on process in this method, thus resulting in a problem of boot screen jumping.

To address the problem of boot screen jumping, the following explains some of the embodiments of the disclosure, taking the combined system including a master device and module devices and the application interface being the home application interface as example for illustration.

In an embodiment of the disclosure, after a master device and module devices perform video initialization, the master device establishes a connection for transmitting video data with prescribed one of the module devices. After system services of the master device and the module device are started, the master device will display directly video data of a home application interface of the prescribed module device, where the video data of the home application interface of the prescribed module device is received by the master device over the connection, so a home application interface of the master device will not be presented in a displayed boot screen, but the home application interface of the module device will be displayed directly after a startup picture is displayed, thus avoiding a jump between the two home application interfaces of the master device and the module device to thereby solve the problem of boot screen jumping.

The video initialization is performed by initializing a video interface device and a corresponding codec device, e.g., a High Definition Multimedia Interface (HDMI) interface device, a Digital Video Interface (DVI) interface device and a corresponding codec device.

The module device can be prescribed as follows without any limitation thereto:

1. The master device records a lastly accessed module device and prescribes this module device for current power-on operation; and 2. Specific one of the module devices is preset by a user in a setting menu as the prescribed module device.

If there is only one module device of the combined terminal system, the module device is defaulted as the prescribed module device.

The master device can display directly the video data of the home application interface of the prescribed module device particularly as follows: if the master device itself is provided with a function of displaying a picture, then the master device can display directly the home application interface of the prescribed module device according to the video data; and if the master device is connectable with an external display device, then the master device can transmit the video data to the external display device and instruct the external display device to display the picture.

If the startup picture of the module device is displayed directly after a logo picture is displayed, then the connection for transmitting video data will be established before the startup picture is displayed, that is, before the system service is started, and the master device will display the video data of the startup picture of the module device while the system service is being started, where the video data of the startup picture of the module device is received by the master device over the connection.

The video data of the startup picture and the home application interface of the module device can be transmitted in real time while the master device is performing the display operation, or can be transmitted to the master device, before the master device performs the display operation, and retrieved by the master device performing the display operation.

Figure 2:
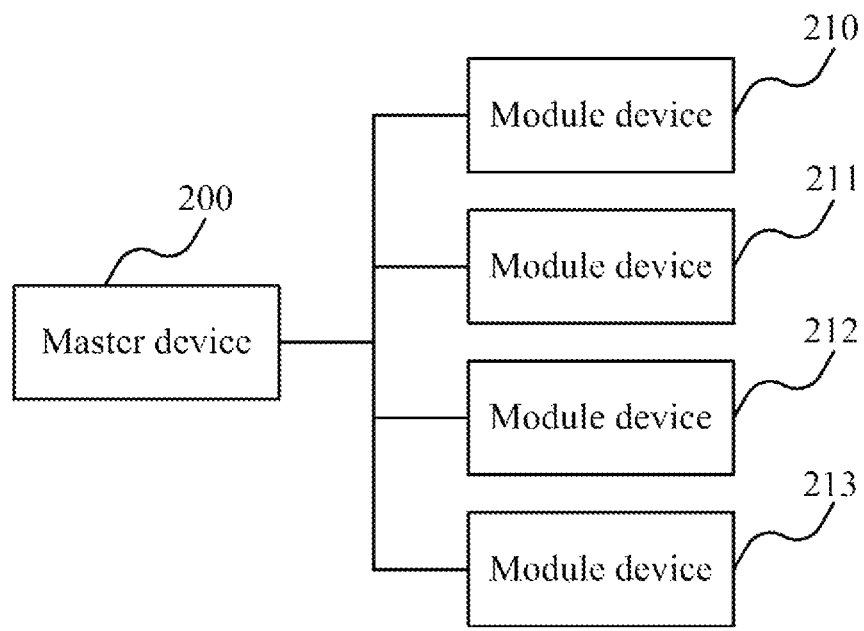
FIG. 2 illustrates a schematic structural diagram of a combined terminal system for displaying a boot screen according to an embodiment of the disclosure.

As illustrated in FIG. 2, a combined terminal system for displaying a boot screen according to one embodiment of the disclosure includes a master device 200 and at least one module device. The combined terminal system according to this embodiment is provided with four module devices 210 to 213, although the number of module devices can be determined in a real implementation as needed. There is prescribed one 211 of these module devices 210 to 213.

The master device 200 is configured to perform video initialization and to establish a connection for transmitting video data with the prescribed module device after the video initialization is completed; and to display video data of a home application interface of the prescribed module device directly after a system service of the master device is started, where the video data of the home application interface of the prescribed module device is received by the master device over the connection; and The prescribed module device 211 is configured to perform video initialization and to establish the connection for transmitting video data with the master device after the video initialization is completed; and to transmit the video data of the home application interface of the prescribed module device to the master device over the connection after a system service of the prescribed module device is started, so that the master device displays the video data of the home application interface of the prescribed module device directly after the system service of the master device is started.

Preferably the master device 200 is further configured:

To display video data of a startup picture of the module device while a system service is being started, where the video data of the startup picture of the module device is received by the master device over the connection; and The prescribed module device 211 is further configured:

To transmit the video data of the startup picture of the prescribed module device to the master device over the connection while the system service is being started, so that the master device displays the video data of the startup picture of the prescribed module device while the system service of the master device is being started.

Boot screen of each of the master device and the module device in a power-on process generally include logo pictures displayed while a boot program is being started and a kernel program is being started, a startup picture displayed while the system service is being started, and the home application interface displayed after the system service is started.

The problem of boot screen jumping in the power-on process can be addressed in the following two approaches as differently needed.

In a first approach, the boot screen is displayed as the logo picture of the master device, the startup picture of the master device, and the home application interface of the module device sequentially.

In this approach, it will suffice if the video data of the home application interface of the module device is obtained after the system service of the master device is started. That is, it will suffice if the connection to transmit the video data of the home application interface of the module device is established before the system service of the master device is started. Thus it will suffice if the video initialization is performed and the connection is established after the kernel program is started and before the system service is started.

In a second approach, the boot screen is displayed as the logo picture of the master device, the startup picture of the module device, and the home application interface of the module device sequentially.

In this approach, the video data needs to be transmitted before the startup picture of the module device is displayed, so the connection to transmit the video data of the startup picture of the module device needs to be established before the system service is started. At this time, the video initialization needs to be performed, and the connection needs to be established, after the kernel program is started and before the system service is started.

In order to shorten boot time, the process of establishing the video connection can be further improved. For example, the connection for transmitting video data can be established directly, without performing a flow of checking video interface related data, upon determining that result of hot plugging detection is successful. Taking an HDMI interface as an example, a conventional connection via a HDMI interface needs to be established by performing a hot plugging detection, Extended Display Identification Data (EDID) verification, High-bandwidth Digital Content Protection (HDCP) initialization, key verification, etc., and the connection can be established only if these operations are performed.

In contrast, a connection via an HDMI interface can be established in this embodiment simply through hot plugging detection without performing the operations of EDID verification, HDCP initialization, key verification, etc. The master device will establish the connection for transmitting video data directly upon the result of hot plugging detection between the master device and the module device being successful to thereby speed up establishment of the connection so as to shorten a boot time.

Moreover after power-on is completed, in order to enable a user to switch conveniently the display picture to the home application interface of the master device or another module device, a signal source switching function can be configured to switch the display picture between the respective devices. For example, the respective home application interfaces are provided with a signal source switching option menu, and a signal source of the corresponding module device or the master device in the menu is selected by a remote controller or another external interaction device.

If the display picture needs to be switched to the home application interface of another module device, then the master device will establish a connection for transmitting video data with the corresponding module device and receive and display corresponding video data; and if the display picture needs to be switched to the home application interface of the master device, then the master device will retrieve and display its own video data directly.

For the combined terminal system for displaying a boot screen according to this embodiment, the master device and the module devices therein can be arranged in the same physical equipment or can be embodied as a plurality of separately arranged physical devices.

When the master device and the module devices are a plurality of separately arranged physical devices, the master device can be a TV set, and the module devices can be set-boxes, network players, DVD players, etc.

When the master device and the module devices are arranged in the same physical equipment, the master device can be a display module, and the module devices can be set-boxes, network playing modules, DVD playing modules, etc.

Figure 3:
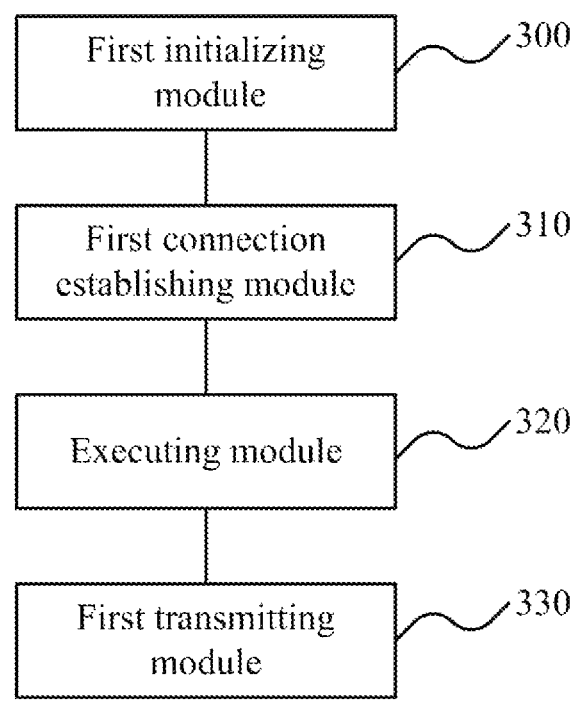
FIG. 3 illustrates a schematic structural diagram of a master device for displaying a boot screen according to an embodiment of the disclosure.

As illustrated in FIG. 3, it is provided a first structure of a master device for displaying a boot screen according to one embodiment of the disclosure, where the master device includes:

A first initializing module 300 is configured to perform video initialization;

A first connection establishing module 310 is configured to establish a connection for transmitting video data with a module device after the master device completes the video initialization;

An executing module 320 is configured to display video data of a home application interface of the module device directly after a system service of the master device is started; and A first transmitting module 330 is configured to receive the video data of the home application interface of the module device over the connection.

Preferably the first connection establishing module 310 is configured:

To establish the connection for transmitting video data with the module device directly after the master device completes the video initialization and determines that the result of hot plugging detection between the master device and the module device is successful.

Preferably the executing module 320 is further configured:

To display video data of a startup picture of the module device while the master device is starting the system service; and The first transmitting module 330 is further configured:

To receive the video data of the startup picture of the module device over the connection.

Figure 4:
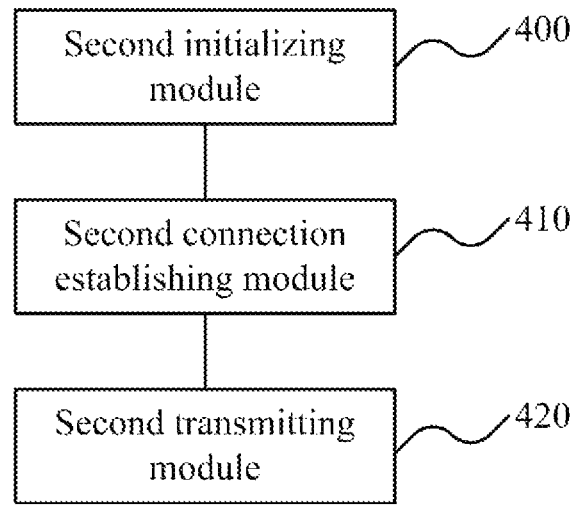
FIG. 4 illustrates a schematic structural diagram of a master device for displaying a boot screen according to an embodiment of the disclosure.

As illustrated in FIG. 4, it is provided a first structure of a module device for displaying a boot screen according to one embodiment of the disclosure, where the module device includes:

A second initializing module 400 is configured to perform video initialization;

A second connection establishing module 410 is configured to establish a connection for transmitting video data with a master device after the module device completes the video initialization; and A second transmitting module 420 is configured to transmit video data of a home application interface of the module device to the master device over the connection after a system service of the module device is started, so that the master device displays the video data of the home application interface of the module device directly after a system service of the master device is started.

Preferably the second transmitting module 420 is further configured:

To transmit video data of a startup picture of the module device to the master device over the connection while the module device is starting the system service, so that the master device displays the video data of the startup picture of the module device while the system service of the master device is being started.

Figure 5:
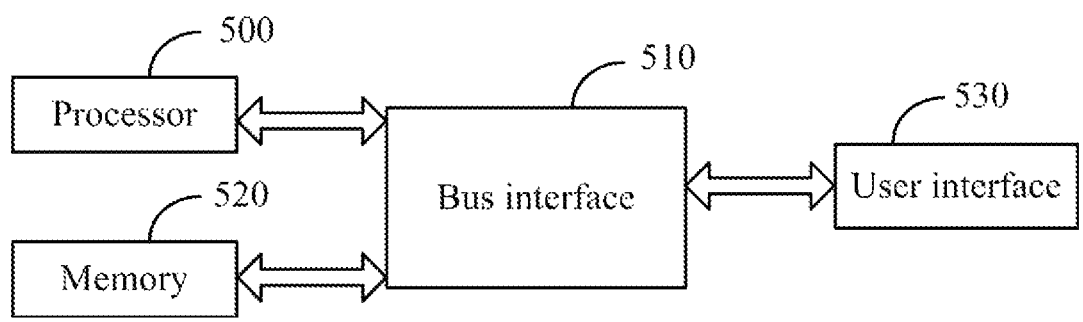
FIG. 5 illustrates a schematic structural diagram of a master device for displaying a boot screen according to an embodiment of the disclosure.

As illustrated in FIG. 5, it is provided a second structure of a master device for displaying a boot screen according to one embodiment of the disclosure, where the master device includes a processor 500, a memory 520, a user interface 530 and a bus interface 510, and the processor 500, the memory 520 and the user interface 530 are connected via the bus interface 510.

The processor 500 is configured to perform video initialization; to establish a connection for transmitting video data with a module device after the video initialization is completed; to display video data of a home application interface of the module device directly after a system service of the master device is started; and to receive the video data of the home application interface of the module device over the connection.

Preferably the processor 500 is configured:

To perform video initialization, and to establish the connection for transmitting video data with the module device directly after the video initialization is completed and successful result of hot plugging detection between the master device and the module device is determined.

Preferably the processor 500 is further configured:

To display video data of a startup picture of the module device while the master device is starting the system service; and to receive the video data of the startup picture of the module device over the connection.

Where in FIG. 5, the bus architecture can include any number of interconnected buses and bridges and particularly connection together one or more processors represented by the processor 500, one or more memories represented by the memory 520, and other various circuits. The bus architecture can further connection together various other circuits, e.g., peripheral devices, a voltage stabilizer, a power management circuit, etc., and all these circuits are well known in the art, so a further description thereof will be omitted in this context. The bus interface 510 serves as an interface. The processor 500 is responsible for managing the bus architecture and performing normal processes, and the memory 520 can store data used by the processor 500 to perform the operations. For different user devices, the user interface 530 can also be an interface connected with an internal or external device as needed, and the connected device can include but will not be limited to a keypad, a display, a speaker, a microphone, a joy stick, etc.

Figure 6:
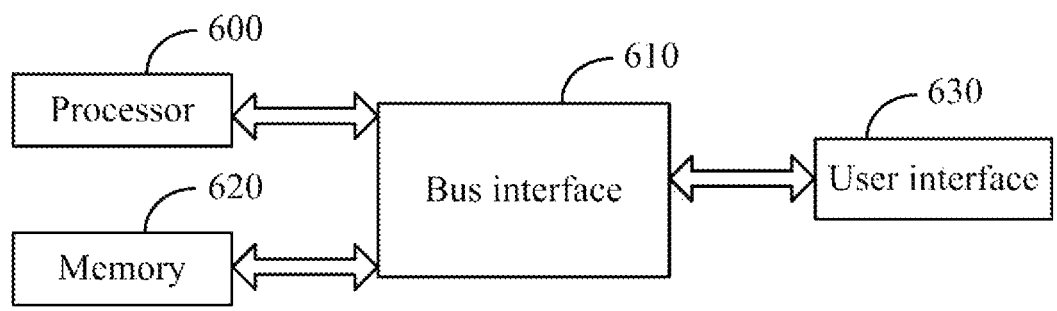
FIG. 6 illustrates a schematic structural diagram of a module device for displaying a boot screen according to an embodiment of the disclosure.

As illustrated in FIG. 6, it is provided a second structure of a module device for displaying a boot screen according to one embodiment of the disclosure, where the module device includes a processor 600, a memory 620, a user interface 630 and a bus interface 610, and the processor 600, the memory 620 and the user interface 630 are connected via the bus interface 610.

The processor 600 is configured to perform video initialization; to establish a connection for transmitting video data with a master device after the video initialization is completed; and to transmit video data of a home application interface of the module device to the master device over the connection after a system service of the module device is started, so that the master device displays the video data of the home application interface of the module device directly after a system service of the master device is started.

Preferably the processor 600 is further configured:

To transmit video data of a startup picture of the module device to the master device over the connection while the module device is starting the system service, so that the master device displays the video data of the startup picture of the module device while the system service of the master device is being started.

Where in FIG. 6, the bus architecture can include any number of interconnected buses and bridges and particularly connection together one or more processors represented by the processor 600, one or more memories represented by the memory 620, and other various circuits. The bus architecture can further connection together various other circuits, e.g., peripheral devices, a voltage stabilizer, a power management circuit, etc., and all these circuits are well known in the art, so a further description thereof will be omitted in this context. The bus interface 610 serves as an interface. The processor 600 is responsible for managing the bus architecture and performing normal processes, and the memory 620 can store data used by the processor 600 to perform the operations. For different user devices, the user interface 630 can also be an interface connected with an internal or external device as needed, and the connected device can include but will not be limited to a keypad, a display, a speaker, a microphone, a joy stick, etc.

Based upon the same inventive idea, an embodiment of the disclosure further provides a method for displaying a boot screen of a master device and a method for displaying a boot screen of a module device, and since these methods correspond to devices which are the master device and the module device in the combined terminal system for displaying a boot screen according to the embodiment of the disclosure, and the methods address the problem under a similar principle to the system, reference can be made to the implementations of the corresponding devices in the system for implementations of the methods, so a repeated description thereof will be omitted here.

Figure 7:
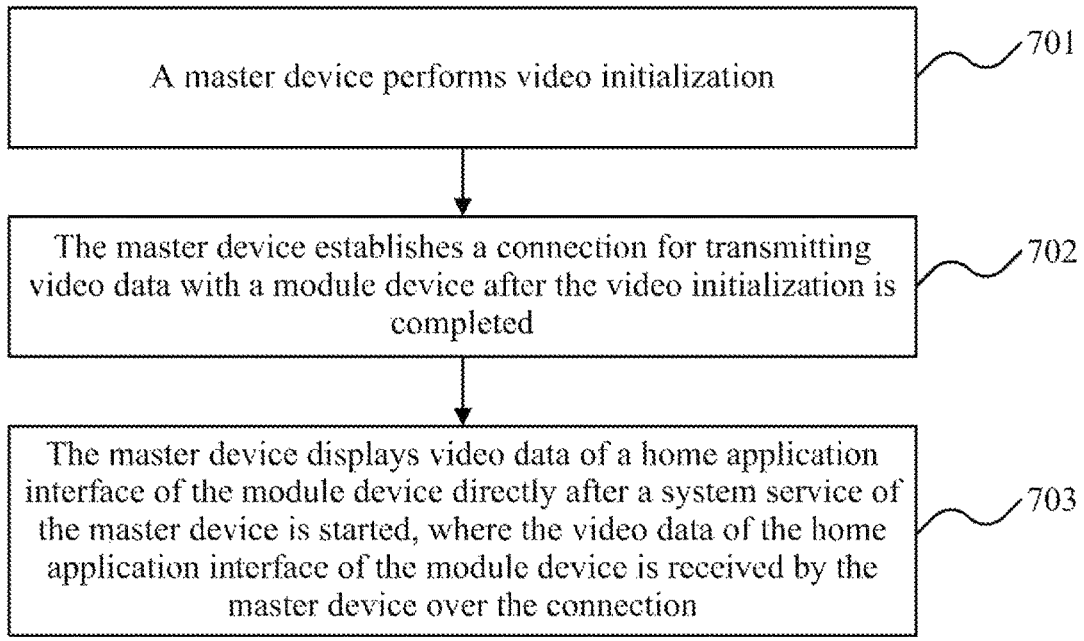
FIG. 7 illustrates a flow chart of a method for displaying a boot screen according to an embodiment of the disclosure.

As illustrated in FIG. 7, a first method for displaying a boot screen according to one embodiment of the disclosure includes:

Operation 701: a master device performs video initialization.

Operation 702: the master device establishes a connection for transmitting video data with a module device after the video initialization is completed;

Operation 703: the master device displays video data of a home application interface of the module device directly after a system service of the master device is started, where the video data of the home application interface of the module device is received by the master device over the connection.

Preferably the master device establishes the connection for transmitting video data with the module device as follows:

The master device establishes the connection for transmitting video data with the module device directly upon determining that the result of hot plugging detection between the master device and the module device is successful.

Preferably after the master device completes the video initialization and establishes the connection for transmitting video data with the module device, the method further includes:

The master device displays video data of a startup picture of the module device while the system service is being started, where the video data of the startup picture of the module device is received over the connection.

Figure 8:
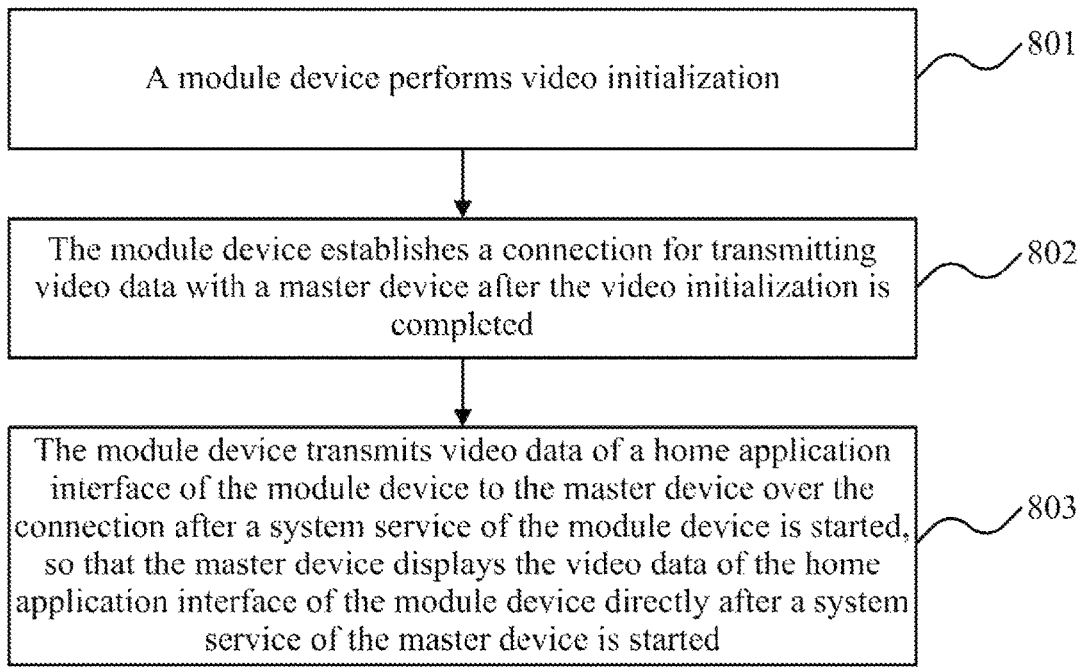
FIG. 8 illustrates a flow chart of a method for displaying a boot screen according to an embodiment of the disclosure.

As illustrated in FIG. 8, it is provided a second method for displaying a boot screen according to one embodiment of the disclosure, where the method includes:

Operation 801: a module device performs video initialization;

Operation 802: the module device establishes a connection for transmitting video data with a master device after the video initialization is completed; and Operation 803: the module device transmits video data of a home application interface of the module device to the master device over the connection after a system service of the module device is started, so that the master device displays the video data of the home application interface of the module device directly after a system service of the master device is started.

Preferably after the module device completes the video initialization and establishes the connection for transmitting video data with the master device, the method further includes:

The module device transmits video data of a startup picture of the module device to the master device over the connection while the system service is being started, so that the master device displays the video data of the startup picture of the module device while the master device is starting the system service.

Figure 9:
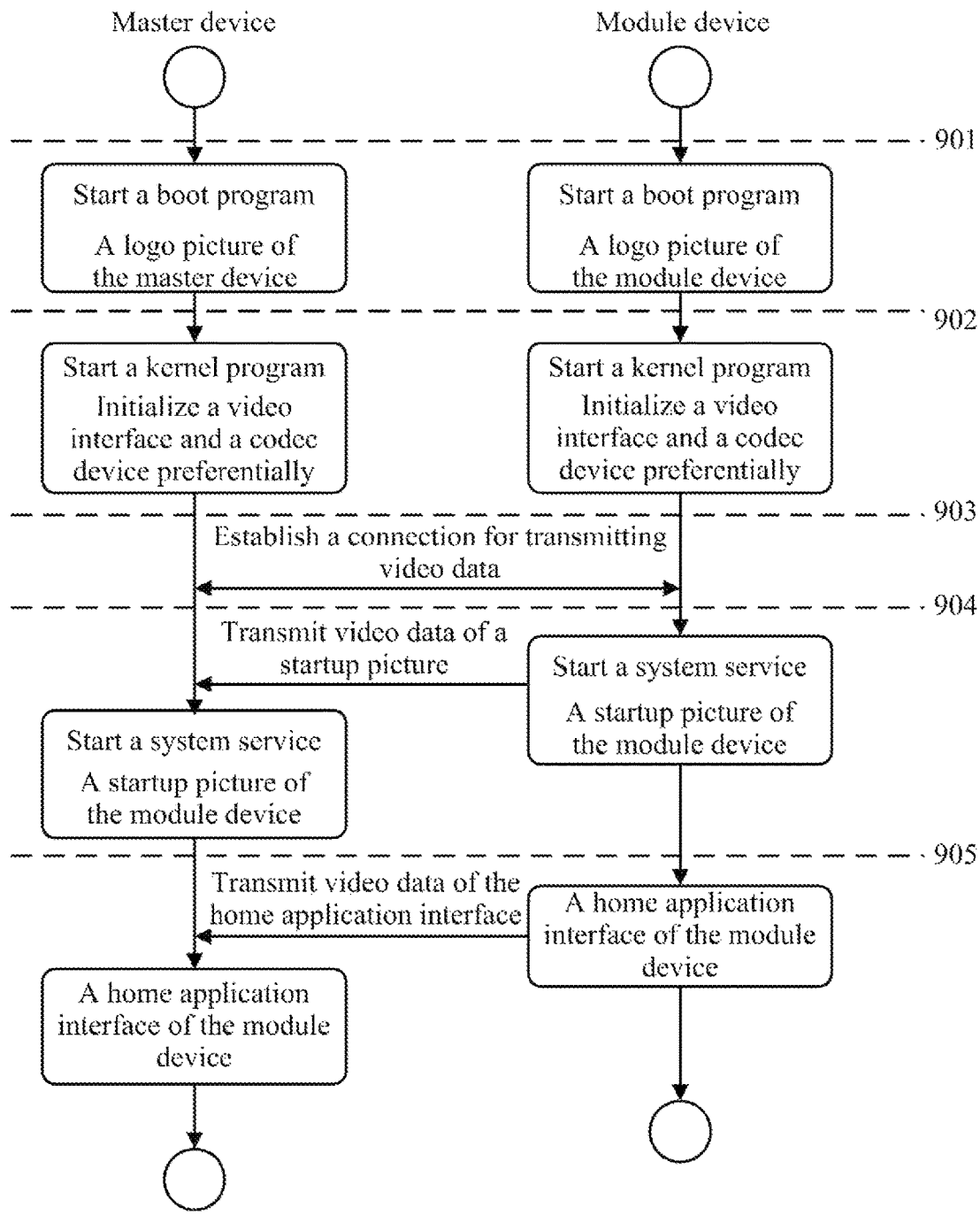
FIG. 9 illustrates a flow chart of a method for displaying a boot screen according to an embodiment of the disclosure.

As illustrated in FIG. 9, it is provided a third method for displaying a boot screen according to one embodiment of the disclosure, where the method includes:

Operation 901: a master device and a module device start a boot program, and perform operations of hardware detection, initialization, etc., respectively.

At this time a boot screen is displayed as a logo picture of the master device.

Operation 902: the master device and the module device start a kernel program respectively.

After the boot program is started, the master device and the module device start the kernel program respectively, where video initialization on a video interface, and a codec device, related to establishment of a connection for transmitting video data are preferentially performed after the boot program is started.

At this time the boot screen is displayed as a logo picture of the master device.

Operation 903: a connection for transmitting video data is established between the master device and the module device.

After the video initialization is completed, the connection for transmitting video data is established between the master device and the module device. Taking an HDMI interface in this embodiment as an example, the master device performs hot plugging detection on the module device, and if the detection result is successful, then the master device establishes the connection without performing the operations of EDID verification, HDCP initialization, key verification, etc., to thereby speed up establishment of the connection so as to shorten a boot time.

Operation 904: the master device displays video data of a startup picture of the module device.

The video data of the startup picture of the module device other than the master device is displayed while a system service is being started.

In this operation of this embodiment, the module device starts the system service before the master device and transmits the video data of its startup picture to the master device in advance before the master device starts the system service, and the master device retrieves and displays the video data of the startup picture of the module device while the system service is being started. Of course, the video data of the startup picture of the module device can alternatively be transmitted in real time while the master device and the module device are starting the system services.

At this time the boot screen is displayed as the startup picture of the module device.

Operation 905: the master device displays video data of a home application interface of the module device.

After the system service is started, the video data of the home application interface of the module device other than the master device will be displayed.

Alike in this operation of this embodiment, the module device starts the system service before the master device and transmits the video data of its home application interface to the master device in advance, and the master device retrieves and displays the video data of the home application interface of the module device after the system service is started. Of course, the video data of the home application interface of the module device can alternatively be transmitted in real time after the master device and the module device start the system services.

At this time the boot screen is displayed as the home application interface of the module device This embodiment merely illustrates a feasible solution to displaying a boot screen, and in the case that the home application interface of the module device is displayed only after the startup picture of the master device, it will suffice if the video initialization is performed in the operation 902, and the connection is established in the operation 903, before the system service is started. The boot screen in this case is displayed sequentially as the logo picture of the master device, the startup picture of the master device, and the home application interface of the module device.

As can be apparent from the description above, the video initialization is performed and the connection for transmitting video data is established preferentially, and the home application interface of the module device is displayed directly, thus avoiding a jump between the two home application interfaces to thereby solve the problem of boot screen jumping, in the power-on process according to the embodiments of the disclosure.

Those skilled in the art shall appreciate that the embodiments of the disclosure can be embodied as a method, a system or a computer program product. Therefore the disclosure can be embodied in the form of an all-hardware embodiment, an all-software embodiment or an embodiment of software and hardware in combination. Furthermore the disclosure can be embodied in the form of a computer program product embodied in one or more computer useable storage mediums (including but not limited to a disk memory, a CD-ROM, an optical memory, etc.) in which computer useable program codes are contained.

The disclosure has been described in a flow chart and/or a block diagram of the method, the device (system) and the computer program product according to the embodiments of the disclosure. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the disclosure have been described, those skilled in the art benefiting from the underlying inventive concept can make additional modifications and variations to these embodiments. Therefore the appended claims are intended to be construed as encompassing the preferred embodiments and all the modifications and variations coming into the scope of the disclosure.

Evidently those skilled in the art can make various modifications and variations to the disclosure without departing from the spirit and scope of the disclosure. Thus the disclosure is also intended to encompass these modifications and variations thereto so long as the modifications and variations come into the scope of the claims appended to the disclosure and their equivalents.

The invention claimed is:

1. A method for displaying a boot screen, wherein the method comprises:
    performing, by a first device, video initialization;
    after the video initialization is completed, after a kernel program of the second device is started, and before a start-up process of a system service of the first device is completed, establishing, by the first device, a connection with a second device for transmitting video data; and
    displaying, by the first device, video data of an application interface of the second device directly after the system service of the first device is started, wherein the video data of the application interface of the second device is received by the first device over the same connection that was established between the first and second devices after the completion of the video initialization and before the completion of the start-up process of the system service of the first device.

2. The method according to claim 1, wherein the first device is a master device, the second device is a module device, and the master device and the module device are arranged in a same physical equipment.

3. The method according to claim 1, wherein after the first device completes the video initialization and establishes the connection for transmitting video data with the second device, the method further comprises:
    displaying, by the first device, video data of a startup picture of the second device while the system service is being started,
    wherein the video data of the startup picture of the second device is received by the first device over the connection.

4. The method according to claim 1, wherein after the first device completes the video initialization and establishes the connection for transmitting video data with the second device, the method further comprises:
    displaying, by the first device, video data of a startup picture of the second device while the system service is being started,
    wherein the video data of the startup picture of the second device is received by the first device over the connection.

5. A method for displaying a boot screen, wherein the method comprises:
    performing, by a second device, video initialization;
    after the video initialization is completed, after a kernel program of the second device is started, and before a start-up process of a system service of the second device is completed, establishing, by the second device, a connection with a first device for transmitting video data; and
    sending, by the second device, video data of an application interface of the second device to the first device over the same established connection after the system service of the second device is started, so that the first device displays the video data of the application interface of the second device directly after a system service of the first device is started.

6. The method according to claim 5, wherein the first device is a master device, the second device is a module device, and the master device and the module device are arranged in a same physical equipment.

7. The method according to claim 5, further comprising:
    after the second device completes the video initialization and establishes the connection for transmitting video data with the first device, sending, by the second device, video data of a startup picture of the second device to the first device over the connection while the system service is being started, so that the first device displays the video data of the startup picture of the second device while the first device is starting the system service.

8. A first device for displaying a boot screen, wherein the first device comprises:
- a memory for storing computer-executable instructions; and
- a processor configured to execute the computer-executable instructions to:
- perform video initialization;
- after the first device completes the video initialization, after a kernel program of the second device is started, and before a start-up process of a system service of the first device is completed, establish a connection with a second device for transmitting video data;
- receive video data of an application interface of the second device over the same connection that was established between the first device and the second device after the completion of the video initialization and before the completion of the start-up process of the system service of the first device; and
- display the video data of the application interface of the second device directly after the system service of the first device is started.

9. The first device according to claim 8, wherein the first device is a master device, the second device is a module device, and the master device and the module device are arranged in a same physical equipment.

10. The first device according to claim 8, wherein the processor is further configured to execute the computer-executable instructions to:
- receive video data of a startup picture of the second device over the connection; and
- display the video data of the startup picture of the second device while the first device is starting the system service.

11. The first device according to claim 8, wherein the processor is further configured to execute the computer-executable instructions to:
- receive video data of a startup picture of the second device over the connection; and
- display the video data of the startup picture of the second device while the first device is starting the system service.

12. A second device for displaying a boot screen, wherein the second device comprises:
- a memory for storing computer-executable instructions; and
- a processor configured to execute the computer-executable instructions to:
- perform video initialization;
- after the second device completes the video initialization, after a kernel program of the second device is started, and before a start-up process of a system service of the second device is completed, establish a connection with a first device for transmitting video data; and
- send video data of an application interface of the second device to the first device over the same established connection after the system service of the second device is started, so that the first device displays the video data of the application interface of the second device directly after a system service of the first device is started.

13. The second device according to claim 12, wherein the first device is a master device, the second device is a module device, and the master device and the module device are arranged in a same physical equipment.

14. The second device according to claim 12, wherein and the processor is further configured to execute the computer-executable instructions to:
- send video data of a startup picture of the second device to the first device over the connection while the second device is starting the system service, so that the first device displays the video data of the startup picture of the second device while the system service of the first device is being started.

15. The method according to claim 1, wherein establishing, by the first device, the connection with the second device includes establishing the connection before the system service of the first device is started.

16. The method according to claim 5, wherein establishing, by the second device, the connection with the first device includes establishing the connection before the system service of the first device is started.

17. The first device according to claim 8, wherein the processor is configured to establish the connection with the second device before the system service of the first device is started.

18. The second device according to claim 12, wherein the processor is configured to establish the connection with the first device before the system service of the first device is started.

19. A terminal system comprising:
- a first device configured to perform video initialization; and
- a second device configured to perform video initialization, wherein:
- the first device and/or the second device are configured to establish a connection between the first device and the second device for transmitting video data after both the first device and the second device complete the video initialization, after a kernel program of the second device is started, and before a start-up process of a system service of the first device is completed;
- the first device is configured to display video data of an application interface of the second device directly after the system service of the first device is started; and
- the video data of the application interface of the second device is received by the first device from the second device over the same established connection.

20. The terminal system according to claim 19, wherein:
- after the connection is established and before the system service is started, the first device receives video data of a startup picture of the second device over the connection; and
- the first device displays the video data of the startup picture of the second device while the system service of the first device is being started.

* * * * *